United States Patent
Clark et al.

(10) Patent No.: US 9,747,034 B2
(45) Date of Patent: Aug. 29, 2017

(54) ORCHESTRATING MANAGEMENT OPERATIONS AMONG A PLURALITY OF INTELLIGENT STORAGE ELEMENTS

(71) Applicant: XIOTECH CORPORATION, Colorado Springs, CO (US)

(72) Inventors: David R. Clark, Monument, CO (US); Jeffrey C. Nicholson, Colorado Springs, CO (US); Bruce R. Dehkes, Jr., Savage, MN (US)

(73) Assignee: Xiotech Corporation, Colorado Springs, CO (US)

( * ) Notice: Subject to any disclaimer, the term of this patent is extended or adjusted under 35 U.S.C. 154(b) by 63 days.

(21) Appl. No.: 13/839,274

(22) Filed: Mar. 15, 2013

(65) Prior Publication Data

US 2014/0201425 A1    Jul. 17, 2014

Related U.S. Application Data

(60) Provisional application No. 61/752,812, filed on Jan. 15, 2013.

(51) Int. Cl.
*G06F 12/00* (2006.01)
*G06F 3/06* (2006.01)

(52) U.S. Cl.
CPC .............. *G06F 3/061* (2013.01); *G06F 3/067* (2013.01); *G06F 3/0635* (2013.01)

(58) Field of Classification Search
CPC ......... G06F 3/061; G06F 3/0635; G06F 3/067
USPC ....................................................... 711/147
See application file for complete search history.

(56) References Cited

U.S. PATENT DOCUMENTS

| | | | |
|---|---|---|---|
| 6,202,080 B1 * | 3/2001 | Lu et al. | 718/105 |
| 7,350,046 B2 | 3/2008 | Sicola | |
| 7,526,684 B2 | 4/2009 | Bicknell | |
| 7,631,034 B1 * | 12/2009 | Haustein | G06F 9/505 709/201 |
| 7,644,228 B2 | 1/2010 | Sicola | |
| 7,913,038 B2 | 3/2011 | Sicola | |
| 7,966,449 B2 | 6/2011 | Sicola | |
| 7,984,258 B2 | 7/2011 | Sicola | |
| 8,352,692 B1 * | 1/2013 | Jordan | 711/162 |
| 2005/0198328 A1 * | 9/2005 | Lee et al. | 709/229 |

(Continued)

*Primary Examiner* — Larry T Mackall
(74) *Attorney, Agent, or Firm* — Hall Estill Attorneys at Law

(57) ABSTRACT

An apparatus and associated methodology contemplating a data storage system having a group of processor-controlled intelligent storage elements (ISEs). Each ISE in the group individually includes storage resources and a network interface. The storage resources of all the ISEs in the group collectively define a field of storage (FoS). A portion of the FoS is addressable by a remote device or by another ISE via the respective ISE's network interface. An ISE FoS structure (ISEFoS) is individually stored in nonvolatile memory within each of the ISEs in the group. Each ISEFoS contains parametric data pertaining to every ISE in the group. Orchestration logic executed by one of the ISEs of the group (a recipient ISE), in response to the recipient ISE receiving a storage management operation request via the network interface, queries the recipient ISE's ISEFoS in order to optimally determine which ISE in the group to use in executing the storage management operation request.

15 Claims, 9 Drawing Sheets

(56) References Cited

U.S. PATENT DOCUMENTS

| | | |
|---|---|---|
| 2012/0030422 A1 | 2/2012 | Elkington |
| 2012/0102350 A1* | 4/2012 | Belluomini .......... G06F 1/3221 |
| | | 713/324 |
| 2012/0166712 A1 | 6/2012 | Lary |
| 2012/0239859 A1 | 9/2012 | Lary |
| 2014/0082295 A1* | 3/2014 | Beard et al. ................. 711/135 |

* cited by examiner

ORCHESTRATING MANAGEMENT OPERATIONS AMONG A PLURALITY OF INTELLIGENT STORAGE ELEMENTS

RELATED APPLICATION

This application claims benefit to the earlier filing date of the U.S. provisional patent application Ser. No. 61/752,812 entitled ORCHESTRATOR that was filed on Jan. 15, 2013.

FIELD

The present embodiments relate generally to the field of complex processor systems and more particularly but without limitation to orchestrating management operations among multiple intelligent storage elements.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity.

It is common to provide such systems with data migration capabilities. Data having a higher level of host interest may be relocated to a portion of the storage array capable of sustaining higher overall data transfer rates, while data in which the host is less interested may be moved to a location capable of sustaining lower overall data transfer rates. This allows the system to maintain a high IO (input/output) data rate while adapting to different user workloads.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY

Some embodiments of the present invention contemplate a data storage system having a group of processor-controlled intelligent storage elements (ISEs). Each ISE in the group individually includes storage resources and a network interface. The storage resources of all the ISEs in the group collectively define a field of storage (FoS). A portion of the FoS is addressable by a remote device or by another ISE via the respective ISE's network interface. An ISE FoS structure (ISEFoS) is individually stored in nonvolatile memory within each of the ISEs in the group. Each ISEFoS contains parametric data pertaining to every ISE in the group. Orchestration logic executed by one of the ISEs of the group (a recipient ISE), in response to the recipient ISE receiving a storage request via the network interface, queries the recipient ISE's ISEFoS in order to optimally determine which ISE in the group to use in executing the storage request.

Some embodiments of the present invention contemplate a computer program product comprising a nontransient computer readable storage medium having a stored computer readable program. The computer program operates on a field of storage (FoS) defined by a group of intelligent storage elements (ISEs). The computer program when executed by a computer processor causes the computer, in response to one of the ISEs (a recipient ISE) receiving a storage request, to instruct the recipient ISE to query parametric data that is stored in nonvolatile memory in the recipient ISE and pertains to each of the ISEs in the group. As a result of the query, the computer identifies another ISE in the group other than the recipient ISE as a best fit ISE which is used to execute the storage request.

Some embodiments of the present invention contemplate a method implemented by execution on one more computer processors for storing digital data. The method includes addressably grouping a plurality of processor-controlled intelligent storage elements (ISEs) to collectively define a field of storage (FoS), each ISE in the group individually including storage resources and a network interface for addressing a respective portion of the FoS. The method also includes storing in nonvolatile memory of each ISE parametric data pertaining to all of the ISEs. The method further includes in response to one of the ISEs (the recipient ISE) receiving a storage request via the respective network interface, querying the recipient ISE's stored parametric data in order to identify another ISE in the group other than the recipient ISE is a best fit ISE which is used in executing the storage request.

DRAWINGS

FIG. 1 generally illustrates a distributed data storage system that is constructed and operated in accordance with embodiments of the present invention.

Figure 3:
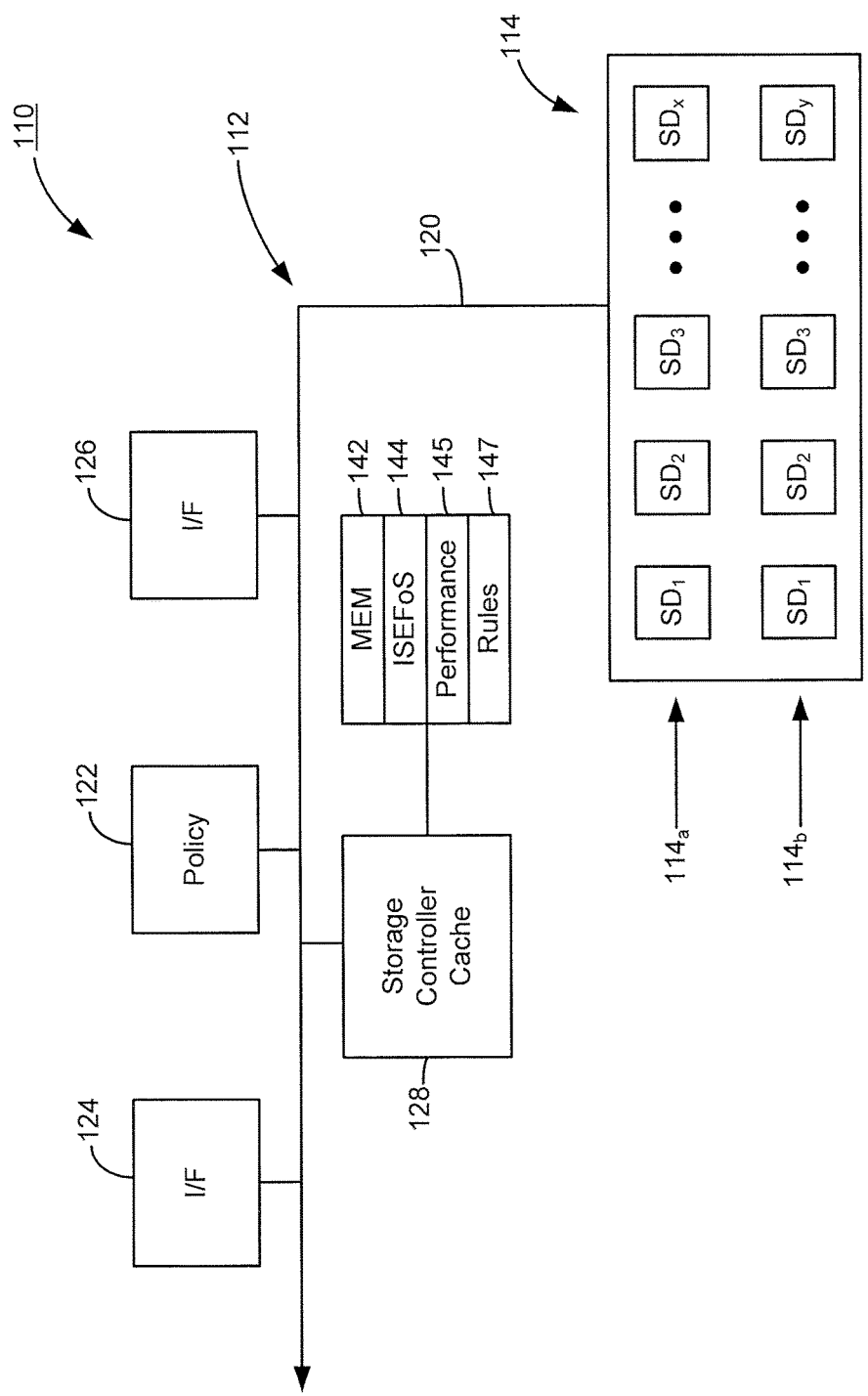
FIG. 3 is a simplified diagrammatic representation of one of the intelligent storage elements (ISEs) of FIG. 1.
Figure 6:
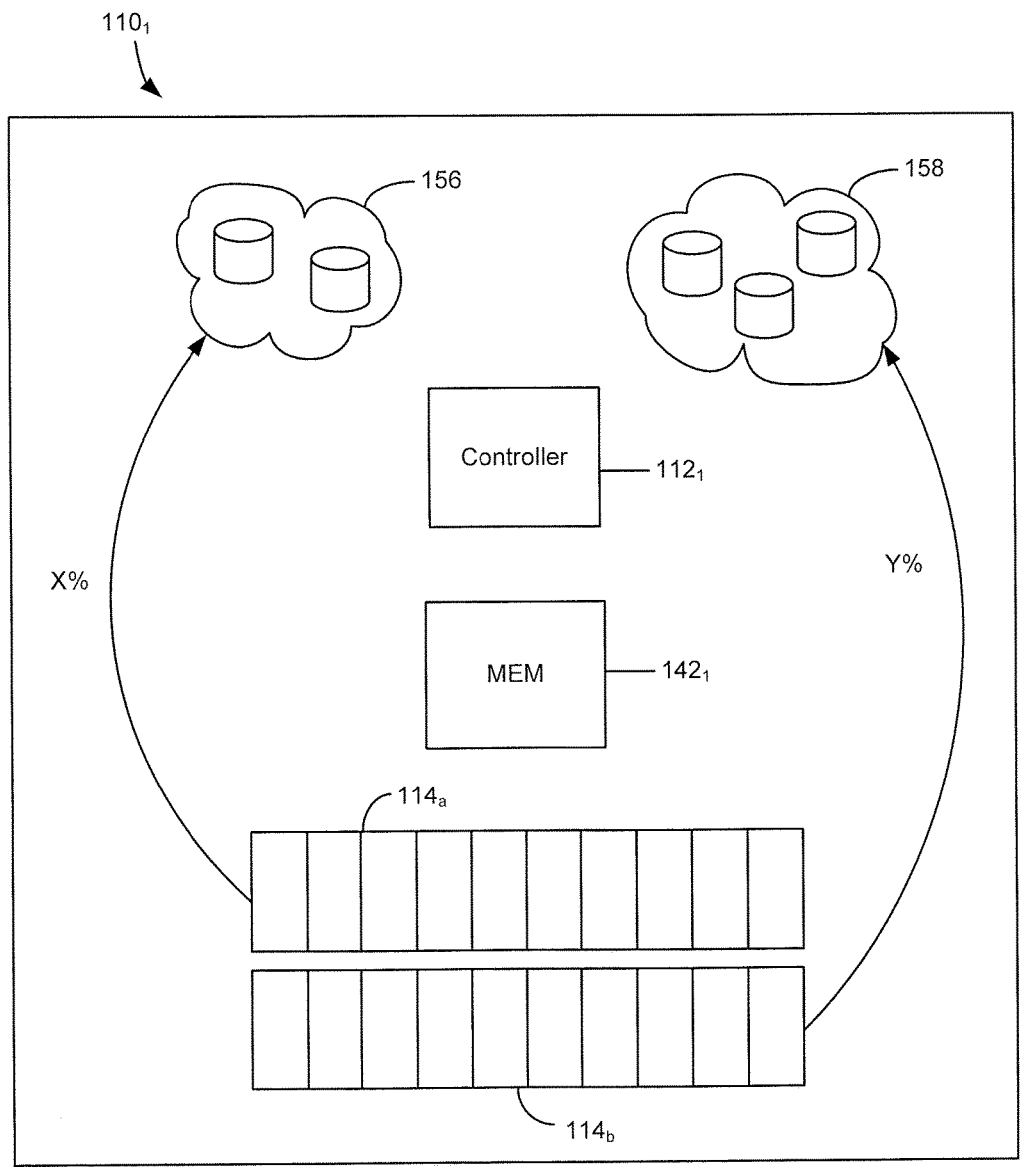

FIG. 6 diagrammatically depicts the ISE of FIG. 3.

Figure 7:
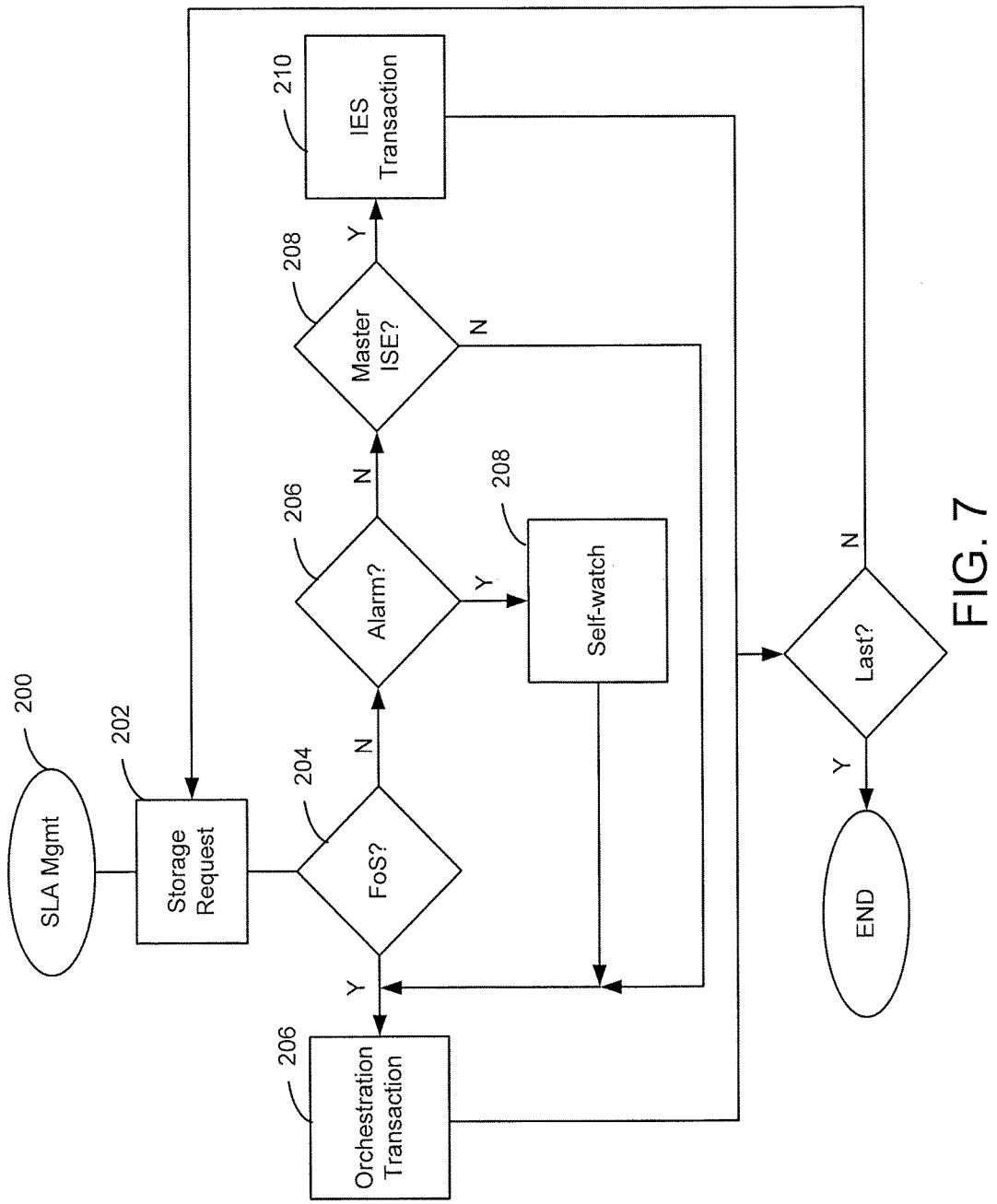

FIG. 7 is a flowchart depicting steps in a method for SERVICE LEVEL AGREEMENT MANAGEMENT in accordance with embodiments of the present invention.

Figure 8:
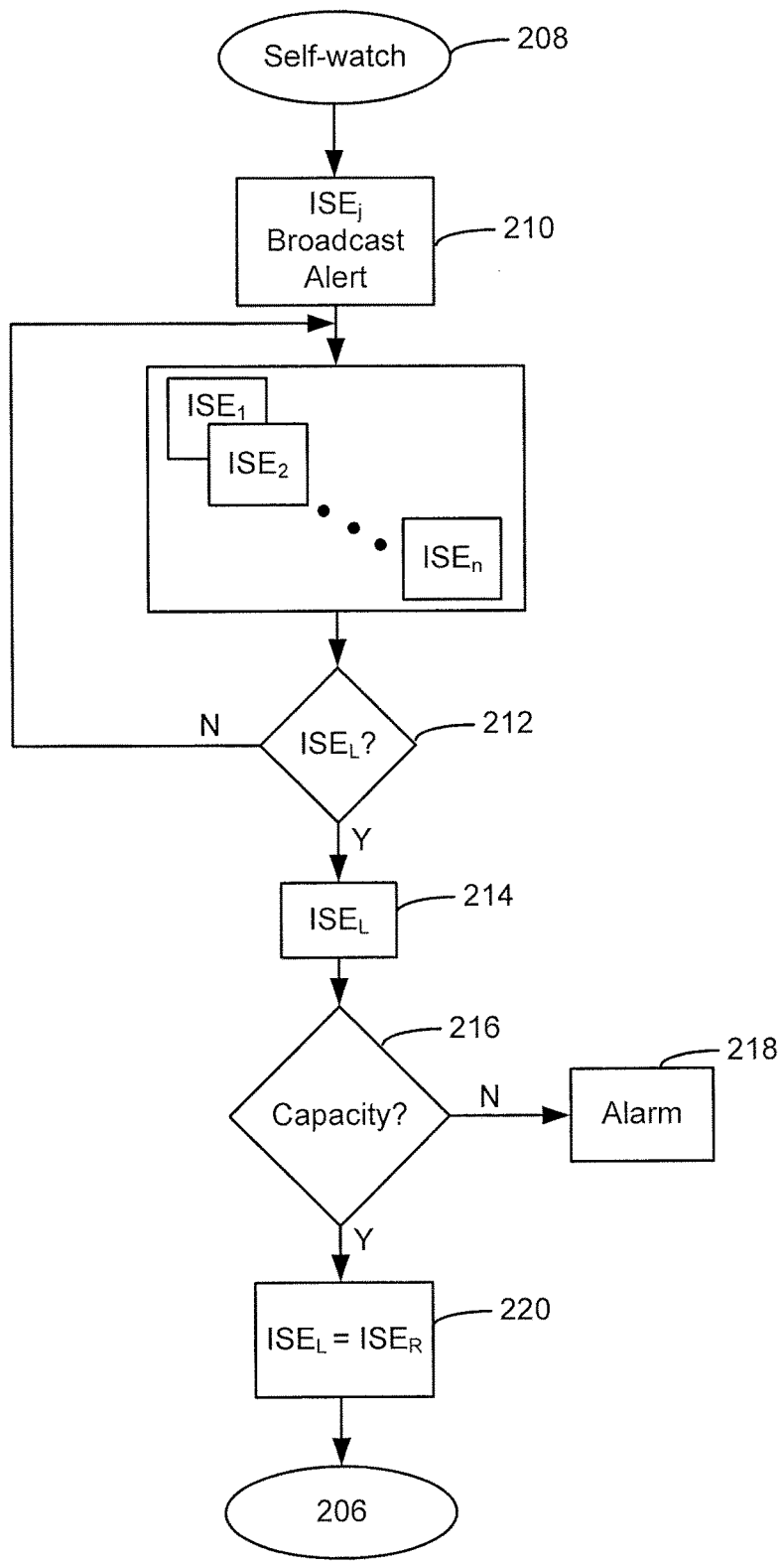

FIG. 8 is a flowchart depicting steps in a method for SELF-WATCH in accordance with embodiments of the present invention.

Figure 9:
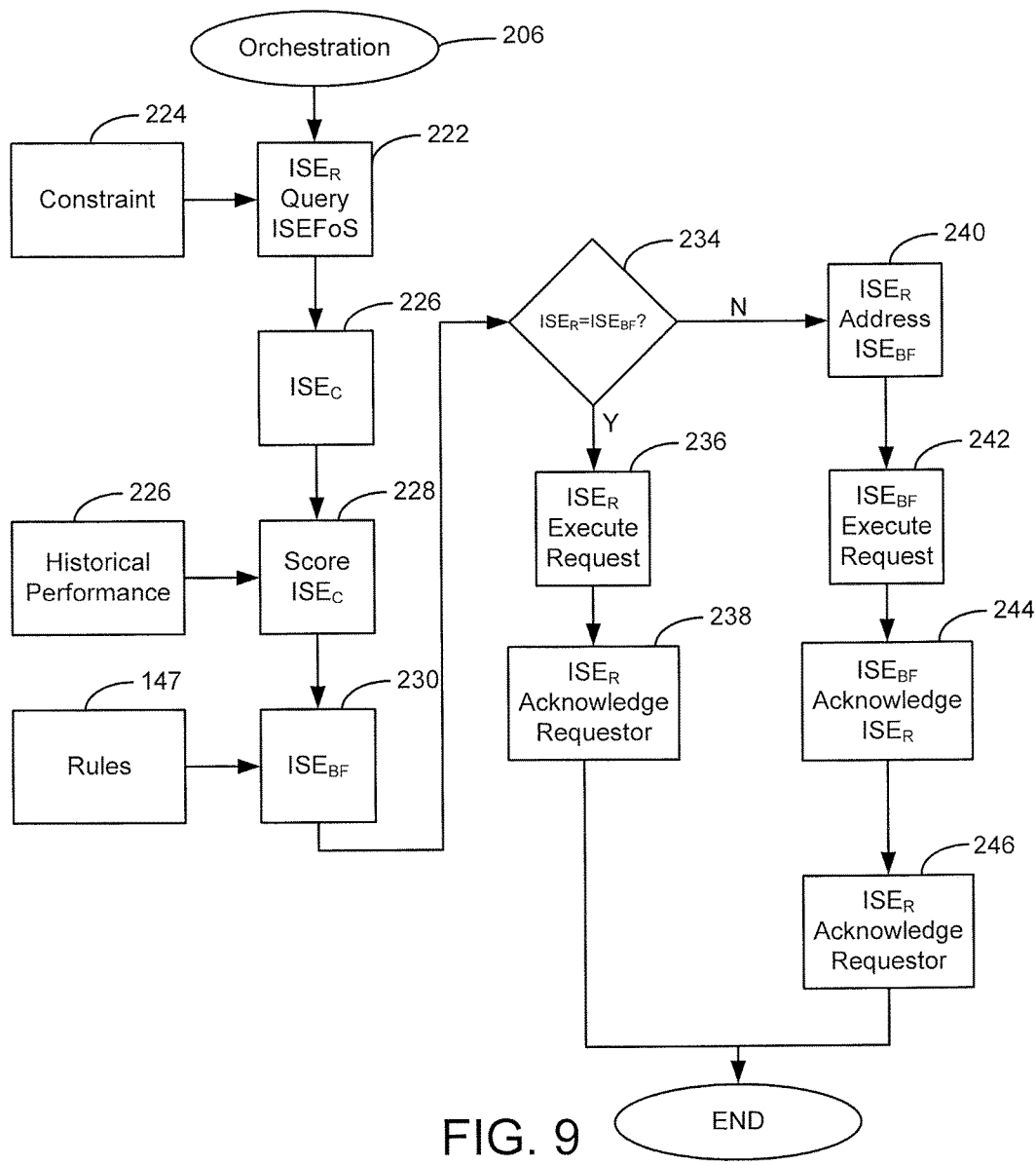

FIG. 9 is a flowchart depicting steps in a method for implementing ORCHESTRATION in accordance with embodiments of the present invention.

DESCRIPTION

Initially, it is to be appreciated that this disclosure is by way of example only, not by limitation. The digital data storage concepts herein are not limited to use or application with any specific system or application that relies on the convenience and capability of distributed data storage systems and associated applications for remote storage and retrieval of data. Thus, although the instrumentalities described herein are for the convenience of explanation, shown and described with respect to exemplary embodiments, it will be appreciated that the principles herein may be applied equally in other types of systems and methods that generally transfer data.

Figure 1:
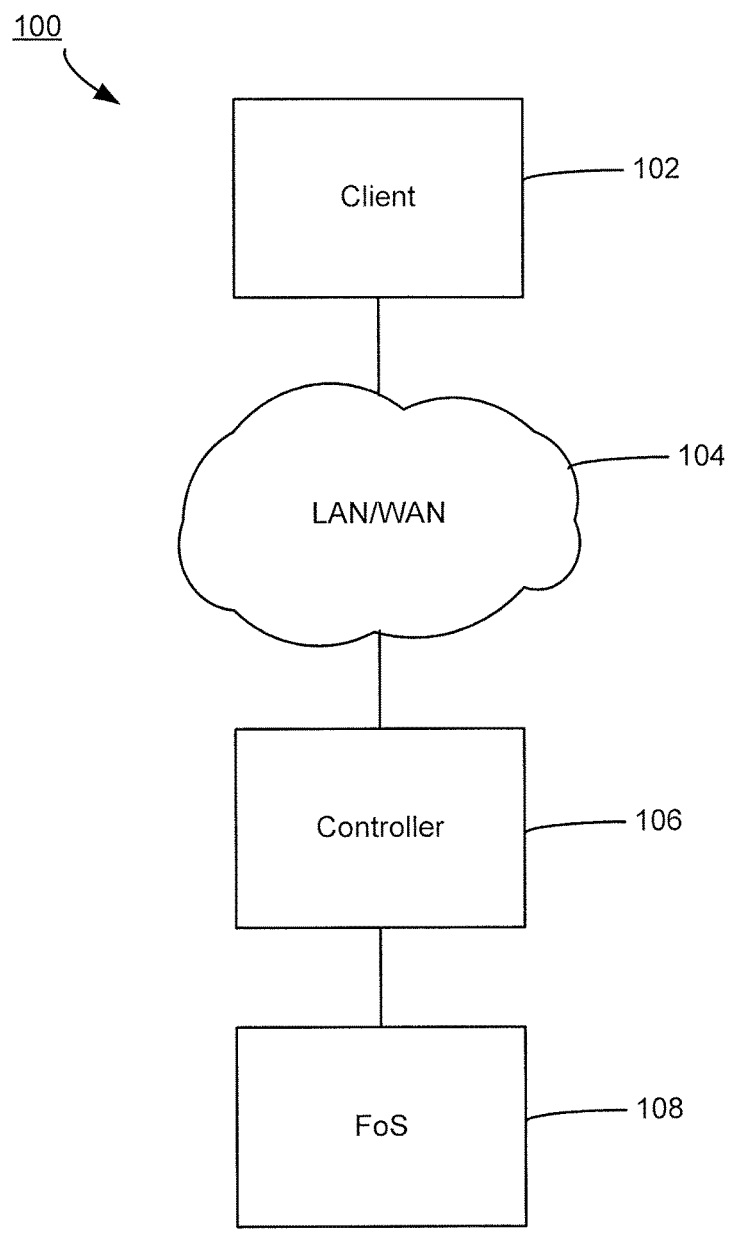

FIG. 1 shows an exemplary data processing system 100 including a client device 102, which may be a personal computer (PC) or other device utilized by a user of the system. The host device 102 communicates across a network 104 with a controller 106, which in turn interfaces with a plurality of individual data storage devices that are viewed by the client 102 as a seamless field of storage (FoS) 108 via logical mapping across the physical storage locations of the plurality of data storage devices. Preferably, the network 104 is a local area or wide area network (LAN/WAN) 106 using Internet protocol (IP) networking infrastructure for communicating over the World Wide Web.

It will be appreciated that the representation of the system 100 in FIG. 1 is highly simplified, as any number of additional features and components may be incorporated into the system as desired. Alternative configurations may include additional client devices; multiple types and hierarchies of networks; the use of redundant controllers to facilitate fail over and fail back redundancy capabilities; multiple types and configurations of data storage arrays within the system, and so on.

The FoS exists across the plurality of individual data storage devices forming a data storage array that is capable of storing data in a RAID (redundant array of independent devices) configuration. As will be recognized, RAID storage involves distributing a set of data across multiple independent data storage devices to enhance data integrity and system reliability. A number of RAID conventions are known in the art, such as but not limited to RAID-0 (which utilizes block level striping across multiple storage devices), RAID-1 (data mirroring), RAID-5 (data striping with distributed parity) and RAID-6 (data striping with double distributed parity).

Figure 2:
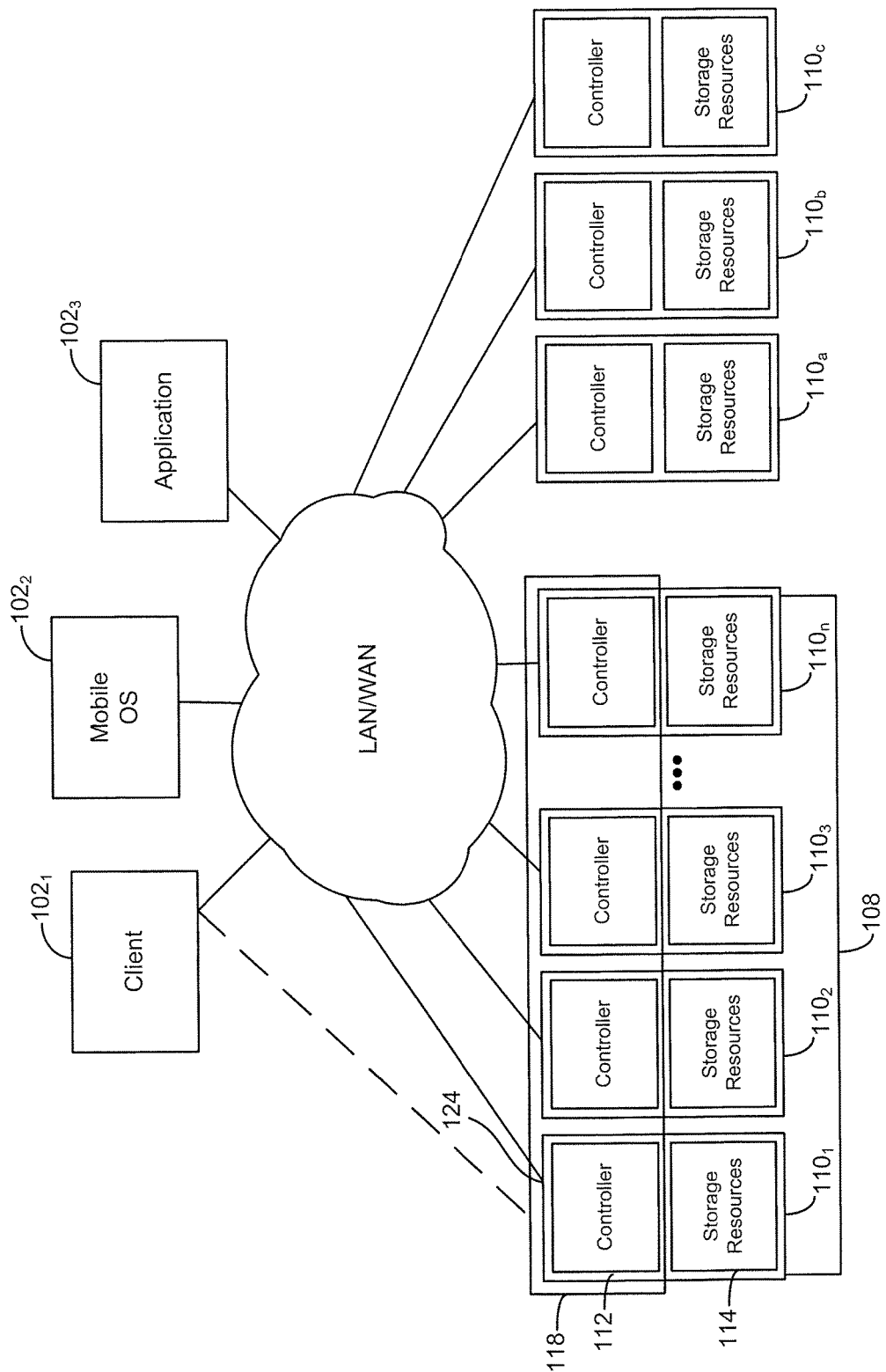
FIG. 2 is a diagrammatic representation of the distributed data storage system of FIG. 1.

FIG. 2 diagrammatically expands the computer system 100 to include multiple clients 102 that are networked to multiple network-attached intelligent storage elements (ISEs) 110 via the network 104. Each ISE 110 includes a controller 112 having top level control of data transfers to and from a set of data storage resources 114, such as in these illustrative embodiments a data storage device array 114. The controller 112 may also individually buffer data being transferred between the clients 102 and the respective data storage device array 114 to optimize I/O throughput performance, such as by employing writeback commands that temporarily store user data and acknowledge the write as being complete before that transfer of user data is actually completed via the data storage device array 114. The controllers 112 may also advantageously employ predetermined fault tolerance arrangements in which parallel, redundant links store at least some of the user data so that a redundant copy of the user data can be retrieved or reconstructed in the event that the primary copy of the user data becomes unavailable.

The clients 102 access applications resident in the ISEs 110 via a respective network interface 124, which routinely requires the transfers of data to and from the respective data storage device array 114. Each ISE 110 provides blocks of data storage capacity for storing the data over various selected communication protocols such as serial ATA, serial SCSI, and fibre-channel, with enterprise or desktop class storage medium making up the data storage device array.

A group of the ISEs $110_1$, $110_2$, $110_3 \ldots 110_n$ are logically grouped by management layer software 118, referred to herein as orchestration logic 118, so that the storage resources of those ISEs collectively form the FoS 108 depicted in FIG. 1. Note that other ISEs 110a, 110b . . . 110i form part of the data storage system 100 but not part of the FoS 108.

The orchestration logic 118 presents the collective extent of all physically addressable storage space of all the data storage device arrays $114_1$, $114_2$, $114_3 \ldots 114_n$ so that each of the remote clients 102 can view the entire FoS 108 (across multiple data storage devices in the same and in different ISEs 110) as a unified storage space. The FoS 108 virtualizes the extent of the physical storage space within all ISEs in the group to a logical addressing nomenclature. A particular portion of the FoS 108 is thereby addressable by a client 102 or by another ISE 110 via the respective ISE's 110 network interface 116. Alternatively, a user via client $102_1$ can directly view the software defined storage (SDS) as virtualized by the orchestration logic 118 and access its management and reporting functionality, as indicated by the broken line in FIG. 2 (frame free services).

FIG. 3 is a block diagram depicting one of the controllers 112 interfacing with its respective data storage device array 114 in accordance with illustrative embodiments of the present invention. It will be appreciated that the diagram of FIG. 3 is merely exemplary, as any number of different types and configurations of controllers and storage arrays can be utilized. The controller 112 includes a main data pathway 120 to facilitate transfer of write data from the client 102 to the data storage device array 114, and to facilitate the return of previously stored readback data from the data storage device array 114 to the client 102. While the pathway 120 is shown as a single contiguous bus, it will be appreciated that this pathway, or data pipeline, can be formed from a number of separate internal and external pathways within the controller 112, including PCI busses and cross-point switches.

One or more policy processors 122, represented by a single functional block 122, provide various control functions for the controller 112. The processor(s) 122 may be realized as one or more programmable processors with associated programming in memory, or in hardware. The network I/F 124 communicates between the controller 112 and the network 104 and hence, in turn, with other ISEs 104 and clients 102 connected to the network 104. In illustrative embodiments the network I/F 124 can be fibre channel ("FC"), fibre channel over Ethernet ("FCOE"), internet small computer systems interface ("iSCSI"), Infiniband, and the like. A data storage device I/F 126 communicates between the controller 112 and the data storage device array 114. In illustrative embodiments the data storage device I/F 126 can be serial attached small computer systems interface ("SAS") and the like. The I/F circuits 124, 126 and the controller 112 form a communication path passing input/output (I/O) commands and corresponding data between the data storage device array 114 and a target (such as another ISE 110 or the client 102) using a cache memory 128.

The controller cache memory 128 represents a local volatile (e.g., DRAM) and/or non-volatile (e.g. Flash memory or battery-backed DRAM) memory space configured to temporarily store data utilized by the controller 112 during operation. The data stored in the cache 128 can include readback data retrieved from the data storage device array 114 for subsequent transfer to the client 102, writeback data supplied by the client 102 for subsequent writing to the data storage device array 114, a metadata table indicative of the data structure of the data storage device array 114, programming used by the policy processors, temporary calculation values such as performance parametric data (discussed below), and so on.

The controller 112 continuously executes applications stored in memory to provide managed reliability of the data integrity. Aspects of the managed reliability include invoking reliable data storage formats such as the RAID strategies. Managed reliability can also include scheduling of diagnostic and correction routines based on a monitored usage of the system. Data recovery operations are executed for copying and reconstructing data. Other aspects of the managed reliability include responsiveness to predictive failure indications in relation to predetermined rules. Each controller 112 can manage assorted storage services such as virtualization, routing, volume management, and data migration/replication.

Although not specifically depicted as such, the controller 112 preferably has active-active dual processing capabilities to increase I/O throughput by co-processing and for failsafe redundancy in the event of loss of one processing side of the controller 112. Each of the dual controllers has top level control of a set of the data storage devices (SDs), designated here as data pack 114$_a$ and data pack 114$_b$.

Each of the data storage device arrays 114 may be classified into one or more number of storage classes. For example, a data storage device array 114 may be designed to optimize storage capacity by making most or all of the data storage devices in the array 114 hard disc drives (HDDs). Alternatively, another data storage device array 114 may be designed to optimize input/output (I/O) performance by making most or all of the data storage devices in the array solid-state drives (SSDs). Other classes can be defined as well by various blending of the numbers of HHDs and SSDs in a data storage device array 114.

As recognized by the skilled artisan, blended HDD and SSD configurations strive to simultaneously optimize two different goals. HDD storage tends to be generally less expensive than SSDs on a per unit cost basis (e.g., dollars per gigabyte of data storage capacity). On the other hand, SSD storage offers a significant advantage over HDD storage in terms of I/O performance (e.g., I/O operations per second). The performance advantages of SSDs over HDDs stem from a number of reasons, including the fact that HDDs can be subject to significant seek and media rotation latencies during operation. In the HDD, accessing any particular set of data stored to the moving media may require a seek time delay to move and settle the associated data transfer member onto the appropriate data storage track, as well as a rotational time delay while the device waits for the data to rotate around to the data transfer member. By contrast, all of the data stored in the SSD can be accessed at substantially the same IO rate, irrespective of where the data are stored within the data storage device array 114.

Figure 4:
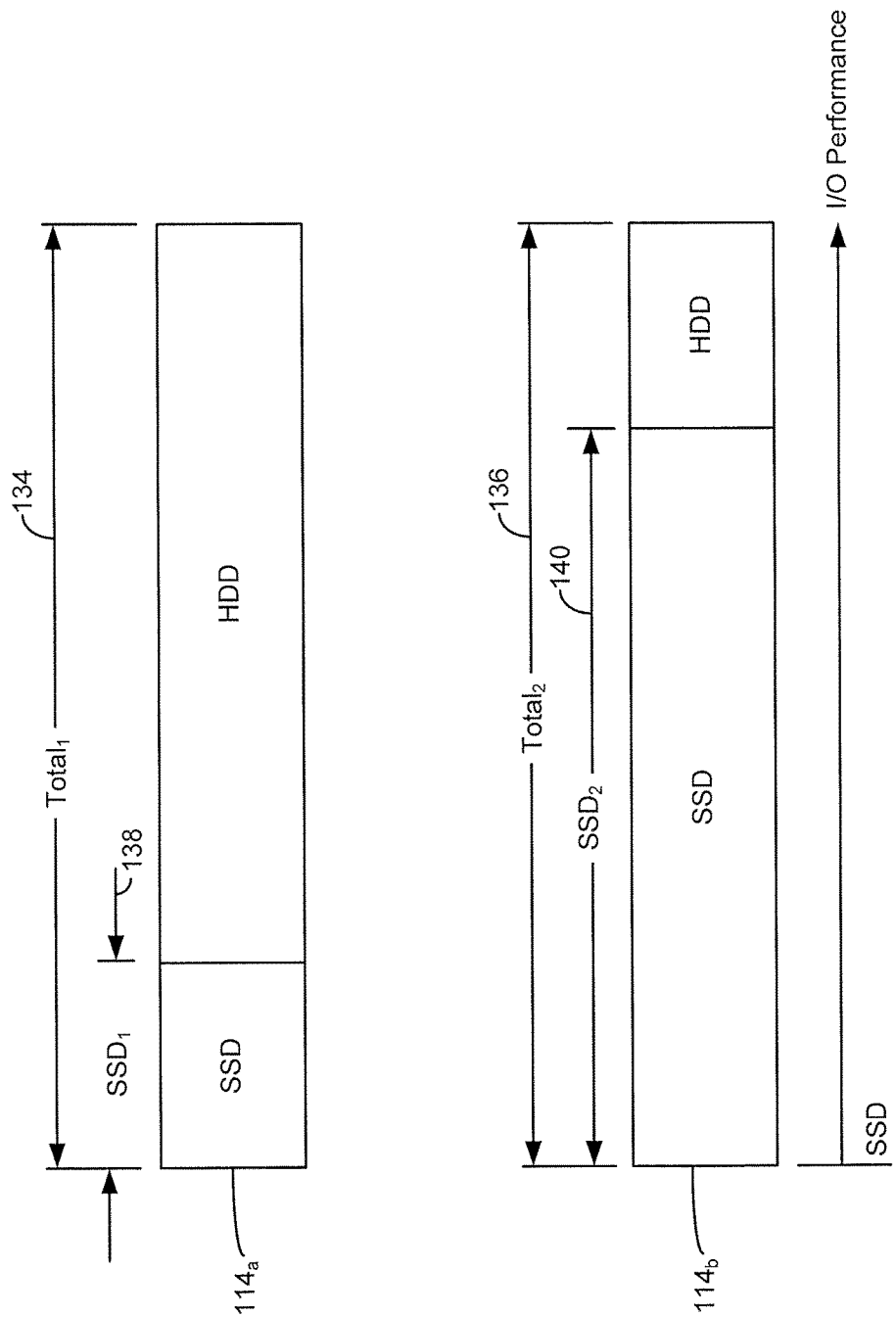
FIG. 4 depicts data packs designed for different classes of storage.

FIG. 4 depicts each of the data packs 114$_a$, 114$_b$ being a blend of HDDs and SSDs. A total data storage capacity 134 of the HDDs and the SSDs in the data pack 114$_a$ (referred to as "Total$_1$") forms a portion of the FoS 108 that is addressable via the network interface 124$_1$ (FIG. 2). Likewise, a total data storage capacity 136 of the HDDs and the SSDs in the data pack 114$_b$ (referred to as "Total$_2$") forms another portion of the FoS 108 that is likewise addressable via the network interface 124$_1$. Distributed data sets (such as RAID sets) may be stored in either the HDDs or the SSDs, distributed across different data storage devices within the same data pack or across different data packs within the same ISE 110, or distributed across different data packs in two or more ISEs 110, all transparently to the client 102 as it transfers data with the FoS 108.

It is apparent that the data pack 114$_a$ is designed predominantly as capacity class storage because a minority of the total memory capacity 134 is made up of SSDs, as indicated by the ratio of SDD storage capacity 138 ("SSD$_1$") to total storage capacity 134. Conversely, the data pack 114$_b$ is designed predominantly as performance class storage because a majority of the total memory capacity 136 is made up of SSDs, as indicated by the comparatively high ratio of SSD storage capacity 140 ("SSD$_2$") to total storage capacity 136. Generally the controller 112 may quantify the storage class of each of its respective data packs 114$_a$, 114$_b$ in terms of:

$$\text{Class of data pack} = \frac{SSD \text{ Storage Capacity}}{\text{Total Storage Capacity}} \qquad (1)$$

For purposes of the present embodiments, the class may be considered individually for each data pack 114$a$, 114$b$, or the controller 112 may combine the data packs to derive the class for the entire data storage device array 114 as follows:

$$\text{Class of data storage device array} = \frac{SSD_1 + SSD_2}{Total_1 + Total_2} \qquad (2)$$

In either case the ratio may then be compared against one or more predetermined thresholds to qualitatively characterize the storage class. For purposes of an illustrative example, it may be predetermined that if the Class value is less than 0.25 then the controller 112 characterizes the data storage device array 114 as capacity class storage; else the controller characterizes it as performance class storage. Alternatively, two thresholds can be similarly employed to define three different storage classes, and so on. For example, it might be useful to classify the storage according to categories of capacity, performance, and high performance. The controller 112 is preferably programmed to periodically check and confirm the storage class characterization because it might be changed if the user reconfigures the numbers of HDDs and SDDs in a particular data storage device array 114.

The storage class is an example of parametric data that is advantageously stored in each ISE 110 for every other ISE 110 in the group defining the FoS 108. Returning to FIG. 3, a nonvolatile memory 142 (e.g. Flash memory or battery-backed DRAM) is accessible to the storage controller 128 to write and subsequently read a data structure 144 for carrying out process operations in accordance with the present invention. For purposes of this description and the appended claims the data structure 144 contained in each ISE 110 and having information about the FoS 108 is referred to as an ISEFoS 144.

Figure 5:
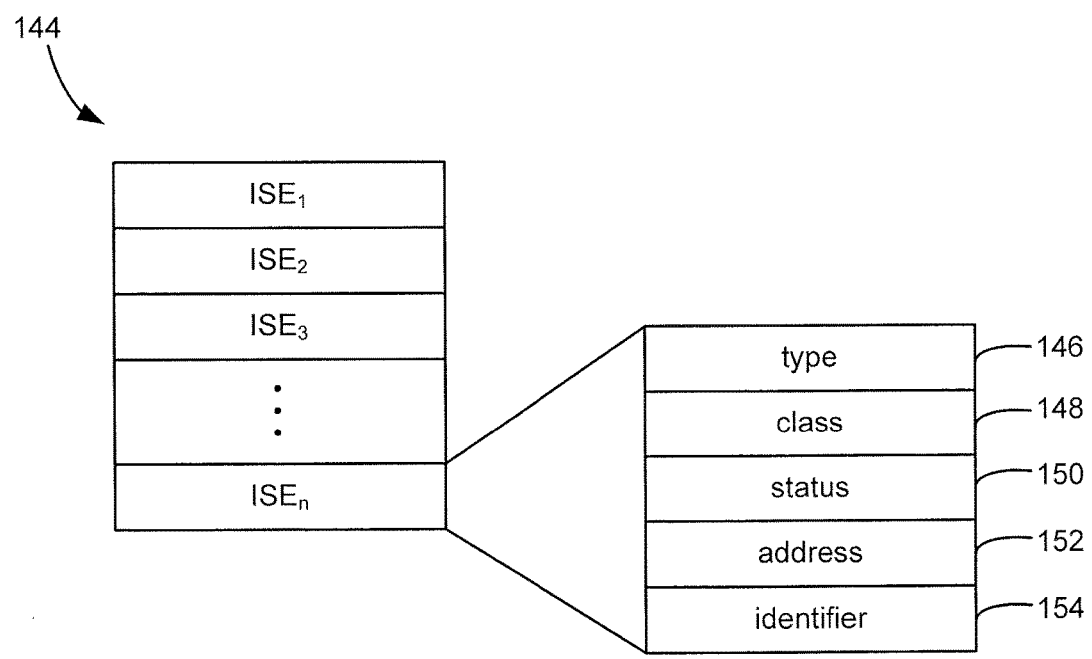
FIG. 5 is a block depiction of the ISE field of storage data structure (ISEFoS).

FIG. 5 is a block depiction of the ISEFoS 144 constructed in accordance with illustrative embodiments and stored as such in each ISE 110. The ISEFoS 144 is shown as a memory space with the requisite formatting instructions to store the parametric data in tabular format, there being a plurality of entries in the table with an entry mapped for each ISE 110 in the group defining the FoS 108, and the table preferably indexable according to an ISE 110 identifying indicia. Importantly, it will be noted the ISEFoS 144 provides the ISE 110 in which it resides some parametric data about every other ISE 110 in the group defining the FoS 108. This means for example the storage controller 128 in $ISE_1$ has access to the parametric data pertaining to $ISE_3$ by indexing its own ISEFoS 144 to the $ISE_3$ entry, and so on.

Illustrative file contents for the $ISE_n$ entry are depicted, and the same parametric data is accessible by the storage controller 128 for each of the other ISEs 110 in the group defining the FoS 108. The parametric data entries in these illustrative embodiments include an indicator for the ISE type 146. The type 146 is a generation-level indicator informing the storage controller 128 what feature set the corresponding ISE 110 is capable of, as might be defined by hardware and/or firmware differences inherent to different generations of ISEs 110 or onboard electronic components thereof. For example, a generation 2 type of ISE might be capable of some enhanced managed reliability routine that a generation 1 type of ISE cannot perform. By knowing the type 146, the storage controller 128 is better able to parametrically sort amongst the ISEs 110 in the group defining the FoS 108 to achieve the purposes of the present embodiments.

Next in the parametric entries is the class 148 discussed above. The class 148 can inform the storage controller 128 as to which of the ISEs in the group defining the FoS 108 are designed for a particular purpose. For these illustrative discussions the class 148 will be limited to two; each ISE 110 in the group defining the FoS 108 will be characterized as either capacity class storage or performance class storage such as according to the discussion above including equations (1) and (2). In equivalent alternative embodiments the class 148 may be more discriminately divided into more than just two classes.

The next parametric entry is status 150 which flags whether any one or more of the data storage devices in the corresponding ISE 110 is reporting an alert due to a failure condition or even a predictive warning condition. When one of the ISEs 110 encounters such a condition it is programmed to transmit an alert message to each of the other ISEs 110 in the group defining the FoS 108. The communication may be a representational state transfer (REST) based application programming interface (API) call to each device via a uniform resource identifier (URI). The URI for each ISE 110 may be stored in the address 152 field. The address 152 field may also include the media access control (MAC) address as a persistent entry burned into the ISE. The MAC address can advantageously be used as a unique identifier that is constant regardless of whether the ISE is responding to a client request directly via its network connection or indirectly via another ISE via its network connection; that is, it is constant regardless of which ISE is the master for the FoS portion(s) of concern. The MAC address can also be advantageously used in support of the Wake-on-LAN (WOL) in the FoS to shut down and restart the ISE for purposes of power savings, heat reduction, and data security.

Finally, in this illustrative example an identification field 154 provides a unique identifier for each of the ISEs 110 in the group defining the FoS 108. For example, the identifier 154 may be a serial number that is useful to the data system 100 in effecting the data transfers, or additionally the identifier 154 may include a field for the user to label each of the ISEs 110 for better recognition via a graphical user interface, such as by identifying each of the ISEs 110 according to where they are physically located and the like.

FIG. 6 is a diagrammatic view of one of the ISEs $110_1$ constructed in accordance with embodiments of the present invention. As described above, typically the controller $112_1$ has active-active dual processing capability, but to simplify this discussion that redundancy is depicted collectively. The controller $112_1$ operates in conjunction with intelligent storage processors (ISPs) to provide managed reliability of the data integrity. The ISPs can be resident in the controller $112_1$ or elsewhere within the ISE $110_1$.

Aspects of the managed reliability include invoking reliable data storage formats such as RAID strategies. For example, by providing a system for selectively employing a selected one of a plurality of different RAID formats creates a relatively more robust system for storing data, and permits optimization of firmware algorithms that reduce the complexity of software used to manage the data storage device array 114, as well as resulting in relatively quicker recovery from storage fault conditions. Managed reliability can also include scheduling of diagnostic and correction routines based on a monitored usage of the system 100. Data recovery operations are executed for copying and reconstructing data. The ISP is integrated with the data storage device array 114 in such a way as to facilitate "self-watch" of the overall data storage capacity without data loss. Other aspects of the managed reliability include responsiveness to predictive failure indications in relation to predetermined rules.

The controller $112_1$ has created a logical volume 156 associated with some portion of, X % as depicted here, the total physical storage capacity of the data pack $114_a$. It will be noted that although the data packs 114a, 114b are depicted as each being constructed of ten data storage devices, that is merely illustrative and not limiting of the number of data storage devices that can be used to form a data pack. In some systems one or more of the data storage devices is designated as a spare in the event of failure of one of the operable data storage devices in the data pack. Preferably, however, the sparing capacity is distributed among all of the data storage devices so that all of the data storage devices are operably utilized in data transfer activities. Likewise, the controller $112_1$ has created another logical volume 158 associated with some portion of, Y % as depicted here, the total physical storage capacity of the data pack $114_b$.

As discussed above, the controller $112_1$ is configured for self-initiating in-situ deterministic preventive recovery steps in response to an observed storage failure. For example, if the ISE $110_1$ experiences a storage device failure in data pack $114_a$, then the failed storage device will immediately be taken off line. The controller $112_1$ will broadcast an alarm to all of the other ISEs 110 in the group defining the FoS via the addresses 152 for each respective ISE 110 stored in its ISEFoS 144. Each of the other ISEs 110 in the group defining the FoS subscribe to such alerts and record them in the respective status 150 of their own ISEFoS 144. That alert status remains the case until ISE $110_1$ subsequently transmits an updated status to the other ISEs in group clearing the alert status after the failure condition has been mitigated, such as by transferring the data from the failed storage device to the spare storage capacity in the data storage device array 114. For example, as a result of $ISE_1$ broadcasting the alert, the $ISE_2$ is able to ascertain that $ISE_1$, either at the data storage device array 114 level or at the data pack level, is undergoing data recovery operations under an alert status. That alert status remains in place until subsequently cleared by the originating ISE 110. Preferably, the ISEs are each programmed to periodically broadcast the latest status and all listening (subscribed) ISEs in the group reflect the latest status for a timely consistency of all statuses across the FoS 108.

All the structure described heretofore enables the data storage system 100 to perform a method 200 of SERVICE LEVEL AGREEMENT MANAGEMENT (SLA MGMT) according to the illustrative steps of the flowchart of FIG. 7. The method 200 begins in block 202 with one of the ISEs receiving a storage request via its respective network interface. For purposes of this description that ISE is referred to as the recipient ISE ($ISE_R$), The storage request 202 may be an application request for allocating storage space in the FoS 108 for some purpose, or it may be an alert transmitted by one of the other ISEs. In either event, the $ISE_R$ in conjunction with its respective ISEFoS, in response to receipt of the storage request, executes the orchestration logic in order to optimally determine which ISE in the group to use in executing the storage request.

Control first passes to block 204 which determines whether the storage request is addressed generally to the FoS 108, and thereby not addressed to the $ISE_R$ itself. If the determination of block 204 is "yes," then control passes to block 206 where the orchestration logic is employed to optimally choose which ISE to use in executing the storage request in a manner according to the embodiments of the present invention.

If, on the other hand, the determination of block 204 is "no," then control passes to block 206 where the orchestration logic determines whether the storage request received in block 202 is an alarm from one of the other ISEs. If the determination of block 206 is "yes," then the orchestration logic executes the self-watch routine depicted by block 208.

FIG. 8 is a flowchart depicting steps in a method 208 for SELF-WATCH of block 208 in accordance with illustrative embodiments of the present invention. The method 208 begins in response to block 210 when one of the ISEs broadcasts an alert status to all of the other ISEs in the group defining the FoS. In response, each of the ISEs ($ISE_1$, $ISE_2$, . . . $ISE_n$) in the group that are individually subscribed to receive the alert makes a determination in block 212 as to whether it is predesignated as the orchestra leader ($ISE_L$) in remedying the alert condition of the other ISE.

The predesignation as to which ISE is the $ISE_L$ can be a dynamic determination based on quantitatively comparing empirical performance characteristics of all the ISEs. For example, in addition to the ISEFoS each ISE can also store ongoing parametric performance data 145 (FIG. 3) that is readily accessible to the storage controller 128 from the non-volatile memory 142. The parametric performance data 145 can include such things as, without limitation, a total number of I/O operations in a set period of time (read, write, and/or total), a data transfer rate (read, write, and/or total), a read-to-write characterization of the load, an average file transfer size, an I/O queue depth, average I/O latency (read and/or write), maximum I/O latency (read and/or write), and the like. Each of the parametric values can be considered with respect to performance in one or more logical volumes or can be considered system-wide. Any number of these parameters can be used and weighted according to that which provides the most accurate representation as to which of the ISEs should be the $ISE_L$ in order to best share the I/O load across all the ISEs in the group making up the FoS. Alternatively, the $ISE_L$ may be dedicated to only one of the ISEs in the group, thereby freeing up all the other ISEs from any I/O load arising from the broadcasted alarm. That dedicated ISE can be defined in terms of any meaningful indicia such as the ISE with the lowest Internet protocol (IP) address or media access control (MAC) address.

By any of those methodologies, when the $ISE_L$ is identified in block 214 control then passes to block 216 where the $ISE_L$ determines whether sufficient storage capacity exists within the FoS to satisfy the storage request. For example, a data storage failure in one of the data storage devices is likely responded to by the managed reliability processes by transferring some or all of the data from the data storage device experiencing a failure to another data storage device. If the determination of block 216 is that there is lacking the sufficient storage capacity for the transfer that is necessary to remedy the alarm condition then the method 208 signals an alarm in block 218 indicating that immediate attention is necessary to minimize the risk of data loss. The $ISE_L$ ascertains whether sufficient capacity exists in the FoS by querying each of the other ISEs, via the addresses in the $ISE_L$'s ISEFoS, to determine how much of each ISE's storage capacity remains available for allocation. For example, the $ISE_L$ ascertains what the X % and Y % standing allocation values (FIG. 6) are for each of the ISEs in the group defining the FoS.

If the $ISE_L$ determines that sufficient storage capacity exists in the FoS to satisfy the storage request, then control passes to block 220 where the $ISE_L$ is designated as the recipient ISE ($ISE_R$) for purposes of executing the orchestration transaction of block 206 (FIG. 7).

Returning to FIG. 7, control along the "no" branch of block 204 and the "no" branch of block 206 passes to block 208 which determines whether the $ISE_R$ is the master ISE for the storage request. Recall that in block 204 it was determined that the storage request of block 202 is not directed to the FoS generally, rather it is directed to a particular addressable portion of the FoS. For example, the storage request in block 202 might be directed to storage space in the data packs 114a, 114b in $ISE_1$ (FIG. 6). In that illustrative event, if the $ISE_R$ is $ISE_1$ (determination of block 208 is "yes") then control passes to block 210 where the $ISE_R$ executes the storage request via an ordinary ISE transaction. If, on the other hand, the $ISE_R$ is not $ISE_1$, then control again passes to the orchestration transaction routine in block 206.

Turning now to FIG. 9 which is a flowchart depicting steps in a method 206 for ORCHESTRATION in accordance with illustrative embodiments of the present invention. The method 206 begins in block 222 with the $ISE_R$ executing the orchestration logic to ascertain from block 224 a constraint that is defined by the storage request. The constraint may define a service level agreement requirement, such as a requirement for a particular storage capacity or a particular class of storage. If, for an illustrative example, the storage request requires one terabyte (TB) capacity of performance class storage, then the $ISE_R$ executes the orchestration logic to query its respective ISEFoS, and according to the class 148 (FIG. 5) value for each ISE it determines which of the other ISEs in the group meet the storage request constraint for performance class storage. Of those that satisfy the class constraint, the $ISE_R$ then checks to see if any of those ISEs are operating under an alarm conditions by checking the status 150 values. If there are two or more other ISEs in the group that individually satisfies the class constraint and is not operating under an alarm condition, then the $ISE_R$ communicates with each of those ISEs via the addresses 152

(FIG. 5) in its ISEFoS to ascertain whether each ISE has adequate storage capacity to meet the one TB storage request capacity constraint in this example.

All of the other ISEs that meet both the capacity and performance constraints in this example, and also found to not be operating under an alarm condition, are identified as candidate ISEs ($ISE_C$) in block 226. The $ISE_R$ executing the orchestration logic then quantifiably compares all the $ISE_C$s in block 228 according to the historic performance data 145 (FIG. 3). Any meaningful algorithm can be employed to quantify the preference of one of the ISEs on the basis of historical performance. For example, without limitation, a score may be ascribed to each $ISE_C$ that reflects certain desirable performance parameters such as high I/O rate and low command queue size, and the selected performance parameters can be individually weighted as desired to achieve the optimal comparative scoring. The individual best scored $ISE_C$ may be declared the best fit ISE ($ISE_{BF}$) in block 230 for executing the storage request.

Alternatively, the individual $ISE_C$ scores may be compared to a threshold score value. All those $ISE_C$s that survive that threshold scrutiny can be further scrutinized according to predetermined rules from block 232. For example, without limitation, the rules 232 may invoke a round-robin selection from among all of the $ISE_C$s that survived the threshold scoring scrutiny. Alternatively, the rules 232 may select the $ISE_{BF}$ on the basis of another meaningful algorithm using one or more of the historic performance parameters 145.

With the $ISE_{BF}$ determined, control then passes to block 234 to determine whether it turned out the $ISE_R$ is also the $ISE_{BF}$. If the determination is "yes," then the $ISE_R$ executes the storage request in block 236 and then acknowledges completion of the storage request to the requestor in block 238. If, on the other hand, the determination of block 234 is "no," then in block 240 the $ISE_R$ addresses the $ISE_{BF}$, such as in a REST API call, in order for the $ISE_{BF}$ in block 242 to execute the storage request. It will be noted that the execution by the $ISE_{BF}$ may involve REST API calls between the $ISE_{BF}$ and other ISEs in the group as well, such as when the storage request involves mirroring. The $ISE_{BF}$ then in block 244 acknowledges completion of the storage request to the $ISE_R$, and in block 246 the $ISE_R$ acknowledges completion of the storage request to the requestor.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed:

1. A data storage system, comprising:
   a group of processor-controlled intelligent storage elements (ISEs), each ISE in the group individually including storage resources and a network interface, the storage resources of all the ISEs in the group collectively defining a field of storage (FoS), a portion of the FoS being addressable by a remote device or by another ISE via the respective ISE's network interface;
   an ISE FoS structure (ISEFoS) individually stored in nonvolatile memory within each of the ISEs in the group, each ISEFoS containing parametric data pertaining to every ISE in the group, every ISE in the group storing, in the nonvolatile memory of the associated ISE, an identical copy of the ISEFoS; and
   orchestration logic executed by one of the ISEs of the group (a recipient ISE), in response to the recipient ISE receiving a storage request via the network interface, to query the recipient ISE's ISEFoS in order to optimally determine which ISE in the group to use in executing the storage request, the ISE in the group optimally determined to use in executing the storage request characterized as a best fit ISE, the best fit ISE configured to subsequently execute the storage request to transfer data between a client device and a selected storage resource of the best fit ISE, the storage request addressed to the FoS generally rather than to any particular ISE in the group, the orchestration logic configured to identify a plurality of candidate ISEs in the group each individually satisfying a storage constraint defined by the storage request and to select the best fit ISE from the plurality of candidate ISEs, the storage constraint comprising a data storage class associated with each of the ISEs in the group.

2. The data storage system of claim 1 wherein the data storage class associated with each of the ISEs in the group is determined responsive to a ratio of solid state drives (SSDs) to hard disc drives (HDDs) in each of the ISEs in the group, wherein at least a first ISE in the group has a first ratio and at least a second ISE in the group has a different, second ratio.

3. The data storage system of claim 2 wherein the data storage class is selected from at least a first class characterized as a capacity based class having a relatively lower ratio of SSDs to HDDs and a second class characterized as a performance based class having a relatively higher ratio of SSDs to HDDs, the storage request identifying a selected one of the first or second classes.

4. The data storage system of claim 1 wherein the storage constraint further comprises a data storage capacity associated with each of the ISEs in the group.

5. The data storage system of claim 1 wherein each of the identical copies of the ISEFoS stored in the nonvolatile memory of each of the ISEs in the group includes type information identifying an associated type for each of the ISEs in the group out of a plurality of available types, the data storage class for each of the ISEs in the group, status information associated with an availability of each of the ISEs in the group to execute storage requests, and identifier information to provide a unique identifier associated with each of the ISEs in the group.

6. The data storage system of claim 1 wherein, responsive to receipt of a second storage request by the recipient ISE addressed to the recipient ISE indicative of an alert status issued by a remaining one of the ISEs in the group, the orchestration logic of the recipient ISE is further executed to compare individual performance characteristics of the ISEs in the group and to carry out a data transfer with the remaining one of the ISEs in the group responsive to the comparison of the individual performance characteristics of the ISEs in the group.

7. The data storage system of claim 6 wherein the second storage request comprises an alarm transmitted by the remaining one of the ISEs in the group to communicate a problematic operating status.

8. The data storage system of claim 1 wherein each ISE in the group periodically transmits operating status information to all of the other ISEs in the group via respective communication paths, the transmitted operating status information incorporated into each of the individual copies of the ISEFoS stored in the nonvolatile memory of the associated ISEs in the group.

9. The data storage system of claim 1 wherein the orchestration logic scores each of the candidate ISEs in relation to respective historical performance data for each candidate ISE.

10. The data storage system of claim 9 wherein the orchestration logic scores each candidate ISE in relation to at least one of input/output (I/O) command queue depth and I/O rate.

11. The data storage system of claim 9 wherein the orchestration logic identifies from the candidate ISE scoring in view of predetermined rules a singular best fit ISE of the group for executing the storage request.

12. The data storage system of claim 11 wherein the predetermined rules compare the candidate ISE scoring to a threshold value.

13. A data storage system, comprising a group of N processor-controlled intelligent storage elements (ISEs) wherein N is a plural integer, each ISE in the group individually comprising a storage resource a network interface, nonvolatile memory and an orchestration circuit, the storage resources of all the ISEs in the group collectively defining a field of storage (FoS), a portion of the FoS being addressable by a remote device or by another ISE via the respective ISE's network interface, the nonvolatile memory within each of the ISEs in the group storing an ISE FoS structure (ISEFoS) comprising parametric data pertaining to every ISE in the group so that N identical copies of the ISEFoS are stored in the system each copy stored in a different ISE in the group, the orchestration circuit of a selected one of the ISEs of the group characterized as a recipient ISE configured to, responsive to receipt of a storage request via the network interface by the recipient ISE, query the recipient ISE's ISEFoS in order to optimally determine which ISE in the group to use in executing the storage request, the ISE in the group optimally determined to use in executing the storage request characterized as a best fit ISE, the best fit ISE configured to subsequently execute the storage request to transfer data between a client device and a selected storage resource of the best fit ISE, the storage request addressed to the FoS generally rather than to any particular ISE in the group, the orchestration logic configured to identify a plurality of candidate ISEs in the group each individually satisfying a storage constraint defined by the storage request and to select the best fit ISE from the plurality of candidate ISEs, the storage constraint comprising a data storage class associated with each of the ISEs in the group.

14. The data storage system of claim 13, wherein responsive to receipt of a second storage request by the recipient ISE addressed to the recipient ISE indicative of an alert status issued by a remaining one of the ISEs in the group, the orchestration circuit of the recipient ISE is further configured to compare individual performance characteristics of the ISEs in the group and to carry out a data transfer with the remaining one of the ISEs in the group responsive to the comparison of the individual performance characteristics of the ISEs in the group.

15. The data storage system of claim 13, wherein the data storage class is selected from at least a first class characterized as a capacity based class having a relatively lower ratio of SSDs to HDDs and a second class characterized as a performance based class having a relatively higher ratio of SSDs to HDDs, the storage request identifying a selected one of the first or second classes.

* * * * *